Patented Sept. 2, 1947

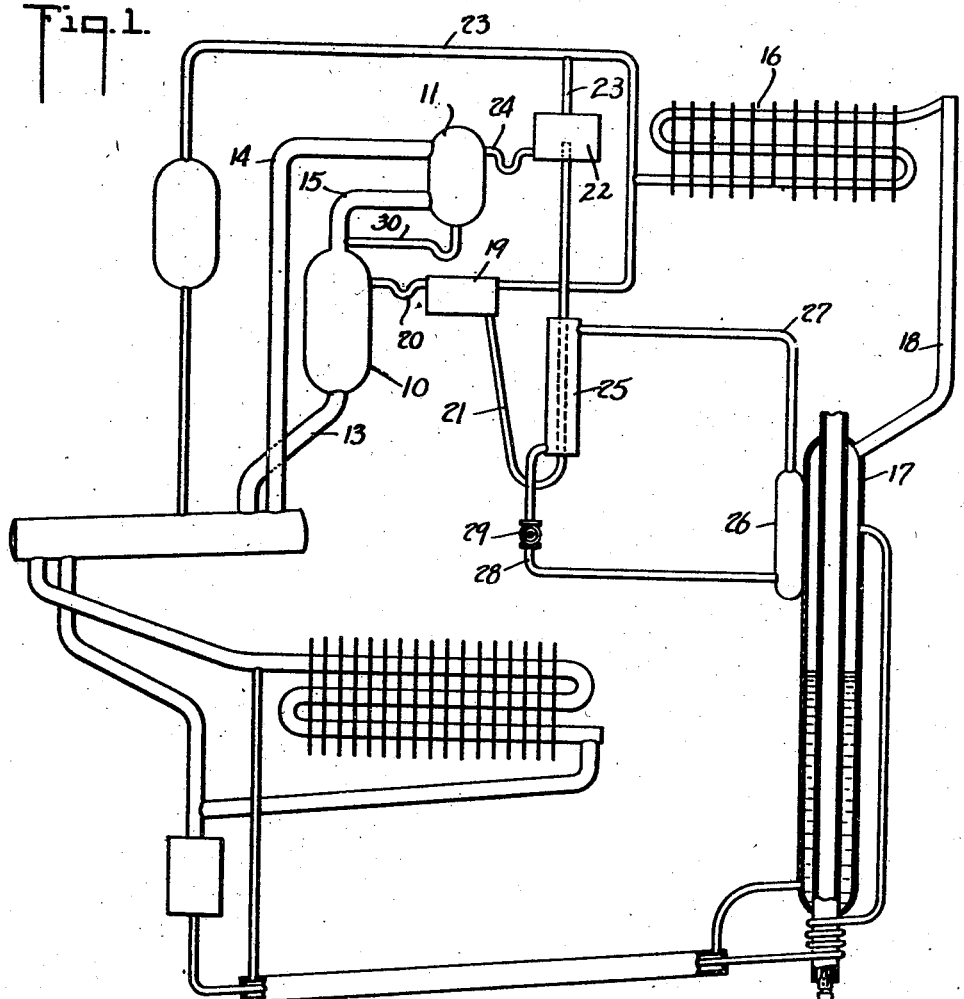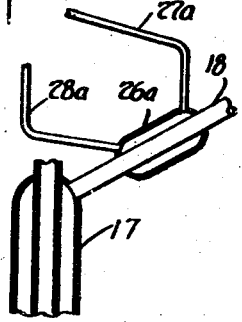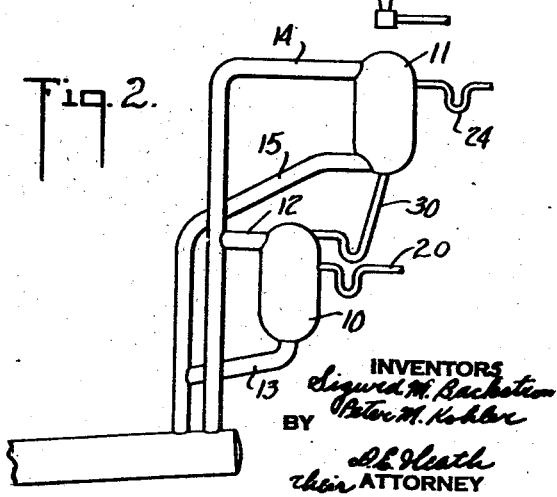

2,426,811

UNITED STATES PATENT OFFICE 2,426,811

DISTRIBUTING LIQUID REFRIGERANT IN ABSORPTION REFRIGERATION SYSTEMS

Sigurd M. Bäckström and Peter M. Köhler, Stockholm, Sweden, assignors to Aktiebolaget Elektrolux, Stockholm, Sweden, a corporation of Sweden Application February 26, 1942, Serial No. 432,474
In Sweden, February 26, 1941

18 Claims. (Cl. 62—5)

This invention relates to absorption refrigerating apparatus of the type employing an auxiliary inert gas, and more particularly to a system of this type having a plurality of evaporators and having provision for controlled distribution of refrigerant liquid to the evaporators.

In the drawings:

Fig. 1 shows more or less diagrammatically a refrigeration system embodying the invention;

Fig. 2 is a similar but partial view illustrating an alternative arrangement of the evaporators in Fig. 1;

Fig. 3 is a similar but fragmentary view illustrating an alternative heat source for operation of the arrangement shown in Fig. 1.

Figure 4:
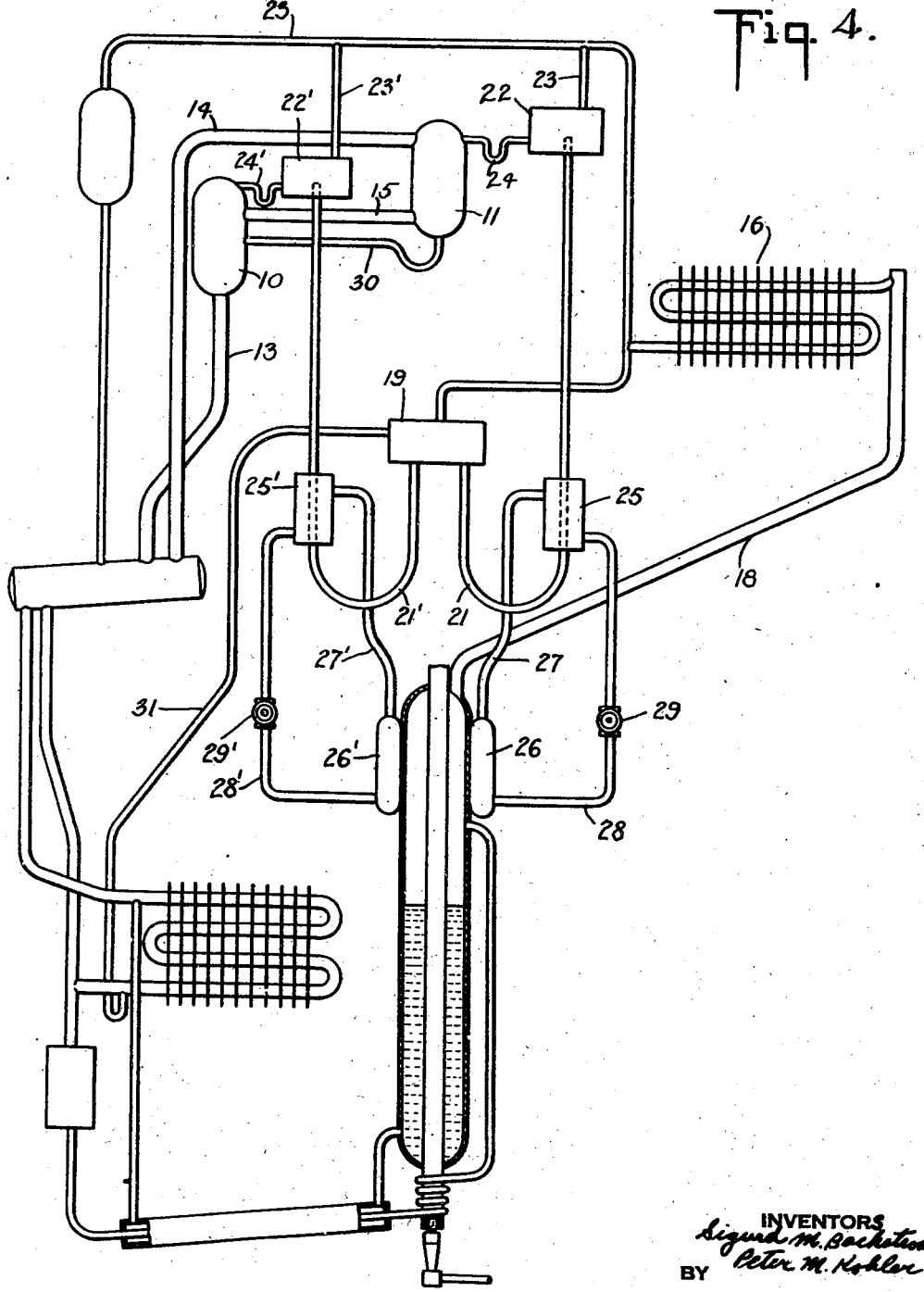
Fig. 4 is a view like Fig. 1 illustrating a modification of the invention.

In Figs. 1 and 4, the refrigeration system illustrated is of a known type, being an absorption type system employing auxiliary inert gas. This system is also called a diffusion type system or a three-fluid type absorption system.

Referring to Fig. 1, reference characters 10 and 11 designate two evaporators in the refrigerating system. Evaporators 10 and 11 are connected in series in the gas circuit which also includes pipes 13, 14 and 15. In Fig. 2, the evaporators 10 and 11 are shown connected in parallel in the gas circuit by pipes 12, 13, 14 and 15.

Referring to Fig. 1, refrigerant vapor expelled from solution in a generator 17 flows through pipe 18 to a condenser 16. The vapor is condensed to liquid in the condenser 16. The present invention has to do with conducting this liquid to the evaporators 11 and 10, and controlling distribution of liquid flow to these evaporators. For this purpose there is provided a receiving vessel 19 which is connected to receive liquid refrigerant from the condenser 16. The upper part of vessel 19 is connected by a pipe 20 to the upper part of evaporator 10. The bottom of vessel 19 is connected by a pipe 21, which is looped downward, to a higher vessel 22. The upper part of vessel 22 is connected to the gas circuit by a pipe 23. Vessel 22 is also connected by a pipe 24 to the other evaporator 11. Jacket 25 is provided around a lower part of that leg of pipe 21 which is connected to vessel 22. Jacket 25 is connected by pipes 27 and 28 to a vaporizing vessel 26. The latter is located in heat exchange relation with the generator 17. Vessel 26 may also be formed as a jacket 26a around pipe 18 as shown in Fig. 3. A valve 29 is provided in pipe 28. This valve is preferably of a hermetically sealed type, and may be either hand operated, or mechanically operated as by a thermostat.

The closed circuit which includes vessel 26 and jacket 25 contains volatile heat transfer fluid which may be ethylene chloride, glycerine, water, or other suitable fluid.

During operation of the refrigerating system, liquid refrigerant from condenser 16 fills vessel 19 and pipe 21 until it overflows from vessel 19 through pipe 20 into evaporator 10. When valve 29 is open, jacket 25 heats the surrounded part of pipe 21 so that refrigerant liquid therein is raised by thermosyphon or gas lift action through pipe 21 into vessel 22. Any vapor issuing from pipe 21 flows from vessel 22 through pipe 23 to the gas circuit of the system. Liquid refrigerant flows from vessel 22 through pipe 24 into evaporator 11. In this manner both evaporators 10 and 11 are supplied with liquid refrigerant. Unevaporated liquid from evaporator 11 flows through conduit 30 into evaporator 10. Unevaporated liquid from the latter drains through pipe 13.

The liquid, such as ethylene chloride, is vaporized in vessel 26 by heat transfer from generator 17. This vapor flows through pipe 27 to jacket 25, thus supplying the heat previously mentioned. The vapor condenses in jacket 25 and, when valve 29 is opened, returns through pipe 28 to vessel 26. When valve 29 is closed, the condensed liquid stays in jacket 25. When jacket 25 is filled, or when vessel 26 is empty, the described heating by jacket 25 is discontinued. When this occurs, lifting of liquid through pipe 21 stops, only evaporator 10 is supplied with liquid.

When vessel 26 is formed as a jacket 26a around pipe 18, as in Fig. 3, it serves as a rectifier.

The rate of heating by jacket 25 can be varied manually or automatically by operation of valve 29. This heating may be adjusted so that no liquid flows to evaporator 11, or liquid flows to both evaporators 10 and 11, as previously described, or so that liquid is raised to evaporator 11 at such a rate that no liquid is supplied to evaporator 10.

In Fig. 4, there is shown a system like that in Fig. 1 with corresponding parts indicated by the same reference numerals, and duplications of these parts indicated by similar primed numerals. In this arrangement, instead of there being an overflow from vessel 19 to evaporator 10, a liquid lift arrangement from vessel 19 to evaporator 10 is provided and it is a duplicate of that arranged between vessel 19 and evaporator 11 as described in connection with Fig. 1. An overflow pipe 31 from vessel 19 is connected to the gas circuit of the refrigerating system. With this arrangement, by operation of valves 29 and 29', as previously described, one or both or neither of the evaporators may be supplied with refrigerant liquid.

In view of the foregoing, it will now be understood that in the embodiment of Fig. 1 liquid refrigerant flows in a path of flow from the refrigerant liquefier or condenser 16 to vessel 19 and thence through conduit 20 to evaporator 10. Hence, evaporator 10 is the initial evaporator to which liquid refrigerant is supplied through conduit 20. From the path of flow just described, leading to the evaporator 10, liquid refrigerant is diverted through the looped conduit 21 which provides a separate path of flow for liquid to the other evaporator 11. The up-leg or higher extending arm of the looped conduit 21 may be referred to as a liquid lift pump through which diverted liquid is raised to a higher level to the vessel 22. Lifting or raising of liquid is accomplished, as previously described, by the heating effected by the heat transfer fluid in the jacket 25. Since such heating is accomplished with the aid of a heat transfer system having a heat receiving part or vaporizing vessel 26 in thermal exchange relation with the generator 17, heat rejected from the system is utilized to raise liquid in the conduit or pump tube 21. In the embodiment of Fig. 3, heat of rectification is utilized to effect heating of the conduit or pump tube 21, thereby also effectively employing heat produced within the refrigeration system to raise diverted liquid refrigerant to vessel 22, from which it flows to the evaporator 11.

The rate at which liquid is raised in the up-leg of the loop conduit 21 is effected independently of the rate of flow of liquid refrigerant in its path of flow from the condenser toward the evaporator 10. Moreover, the rate of flow of liquid upwardly through conduit 21 may be varied to supply liquid in varying proportions to the evaporators 10 and 11 or only to one of the evaporators without exercising control of the heat input to the generator 17 and without exercising control of the gas circulation in the gas circuit of which the evaporators 10 and 11 and pipes 13, 14 and 15 form a part.

In the embodiment of Fig. 4, the higher extending arms of the looped conduits 21 and 21' are of different lengths, thereby providing liquid lift pumps of different height for raising liquid to the evaporators 10 and 11.

Various other changes and modifications may be made within the scope of the invention as set forth in the following claims.

What is claimed is:

1. A refrigeration system having a gas circuit including a plurality of evaporators, a source of liquid refrigerant, separate paths of flow for liquid refrigerant from said source to one and another of said evaporators, and a heat operated pump in each of said paths of flow.

2. A diffusion type refrigeration system having a gas circuit including a plurality of evaporators, a source of liquid refrigerant, and means utilizing a source of liquid refrigerant, and means utilizing heat produced within the system to cause division of liquid from said source against the action of gravity for distribution to said evaporators.

3. An hermetically sealed refrigeration system of the three-fluid absorption type including a plurality of evaporators, a source of liquid refrigerant, means including a heat operated device for dividing liquid from said source for distribution to said evaporators, and means for regulating said heat operated device to control said distribution.

4. The method of distributing liquid refrigerant in an absorption refrigeration system having a number of elements including a plurality of evaporators interconnected for the circulation of refrigerant, an absorbent and an inert gas, which comprises flowing liquid refrigerant in a path of flow leading to one of the evaporators, diverting liquid refrigerant from said path of flow, heating diverted refrigerant to cause it to flow in a separate path to another of said evaporators, and controlling the heating of diverted refrigerant to control the flow of such refrigerant to said other evaporator.

5. The method of distributing liquid refrigerant in an absorption refrigeration system having a series of elements including a plurality of evaporators interconnected to provide a closed circuit for the circulation of a refrigerant, an absorbent and an inert gas, which comprises heating liquid refrigerant in said system to cause it to flow separately to each of said evaporators, and regulating the rate of heating of the liquid refrigerant to separately control the flow of refrigerant to said evaporators.

6. The method of distributing liquid refrigerant in a heat operated refrigeration system having a number of elements including a plurality of evaporators interconnected for the circulation of refrigerant, an absorbent and an inert gas, which comprises flowing liquid refrigerant in a path of flow leading to one of the evaporators, diverting liquid refrigerant from said path of flow, utilizing heat rejected from said system to heat diverted liquid refrigerant to cause it to flow in a separate path to another of said evaporators, and controlling the heating of diverted refrigerant to control the flow of such refrigerant to said other evaporator.

7. The method of distributing liquid refrigerant in an absorption refrigeration system having a number of elements including a plurality of evaporators interconnected for the circulation of refrigerant, an absorbent and an inert gas, which comprises flowing liquid refrigerant in a path of flow leading to one of said evaporators, diverting liquid refrigerant from said path of flow, and heating diverted liquid refrigerant to cause it to flow by gas lift action to another of said evaporators at a rate independent of flow of liquid in said path of flow leading to said one evaporator.

8. The method of distributing liquid refrigerant in an absorption refrigeration system having a number of elements including a plurality of evaporators interconnected for the circulation of refrigerant, an absorbent and an inert gas, which comprises flowing liquid refrigerant by gravity in a path of flow leading to one of said evaporators, diverting liquid refrigerant from said path of flow, heating diverted refrigerant to cause it to flow by gas lift action to another of said evaporators, and controlling the heating of diverted refrigerant to control the distribution of refrigerant between said evaporators.

9. A refrigeration system operated by a source of heat input and having a gas circuit including an evaporator, a refrigerant liquefier, a heat operated device for causing flow of liquid refrigerant from said liquefier to said evaporator where said liquid is utilized to produce a refrigerating effect, and means operable to control the supply of heat to said heat operated device and regulate said flow without exercising control of said heat input.

10. A refrigeration system operated by a source of heat input and having a gas circuit including a plurality of evaporators, a refrigerant liquefier, a heat operated device for causing flow of liquid refrigerant from said liquefier to one of said evaporators in which said liquid is utilized to produce a refrigerating effect, said device being operated by heat rejected from said system, and means operable to control the supply of heat to said heat operated device and regulate said flow without exercising control of said heat input.

11. A refrigeration system having a gas circuit including first and second evaporators, a refrigerant liquefier, a first conduit for conducting liquid refrigerant from said liquefier to said first evaporator, an additional conduit for conducting refrigerant liquid from said liquefier to said second evaporator by gas lift action, said first conduit being so connected that said first evaporator is the initial evaporator to which liquid refrigerant is supplied therethrough, and said first and second evaporators being so connected and arranged that unevaporated liquid flows from one to the other.

12. A hermetically sealed refrigeration system having a gas circuit including a plurality of evaporators, a refrigerant liquefier, means hermetically sealed in said system operable to cause distribution of liquid from said liquefier to one and another of said evaporators, and means for controlling said distributing means to supply liquid simultaneously to said evaporators in varying proportions or only to one of said evaporators.

13. A diffusion type refrigeration system having a gas circuit including a plurality of evaporators in which gas is caused to circulate, a refrigerant liquefier, a first conduit for conducting liquid from said liquefier to one of said evaporators, a liquid lift for causing flow of liquid refrigerant from said liquefier to another of said evaporators against the action of gravity, said first conduit being so connected that said one evaporator is the initial evaporator to which liquid refrigerant is supplied therethrough, and means for controlling said liquid lift to regulate said flow without exercising control of the circulation of gas in said circuit.

14. A refrigeration system having a gas circuit including first and second evaporators, a refrigerant liquefier, a vessel connected to receive liquid refrigerant from said liquefier, an overflow conduit from said vessel to said first evaporator, a conduit including a liquid lift pump from said vessel to said second evaporator, said overflow conduit being so connected that said first evaporator is the initial evaporator to which liquid refrigerant is supplied therethrough, and a connection for said first and second evaporators for conducting unevaporated liquid from one to another.

15. A refrigeration system having a gas circuit including a plurality of evaporators connected and arranged so that unevaporated liquid refrigerant flows from one to another, a refrigerant liquefier, a vessel connected to receive liquid refrigerant from said liquefier, and separate conduits from said vessel to one and another of said evaporators, each of said conduits including a liquid lift pump.

16. A refrigeration system having a gas circuit including a plurality of evaporators, a refrigerant liquefier, separate conduits for conducting liquid from said liquefier to one and another of said evaporators, each of said conduits including a liquid lift pump of different height.

17. An hermetically sealed refrigeration system of the three fluid absorption type operated by a source of heat input and comprising a gas circuit including an evaporator in which gas is caused to circulate, a source of liquid refrigerant, means utilizing energy produced within the system for causing flow of liquid refrigerant from said source of liquid refrigerant upward to said evaporator, and hermetically sealed means operable to control said refrigerant liquid flowing means without exercising control of said heat input and the circulation of gas in said circuit.

18. A diffusion type refrigeration system having a gas circuit including a plurality of evaporators in which gas is caused to circulate, a refrigerant liquefier, a first conduit for conducting liquid from said liquefier to one of said evaporators, a liquid lift for causing flow of liquid refrigerant from said liquefier to another of said evaporators against the action of gravity, and means for controlling said liquid lift to regulate said flow without exercising control of the circulation of gas in said circuit.

SIGURD M. BÄCKSTRÖM.
PETER M. KÖHLER.

REFERENCES CITED

The following references are of record in the file of this patent:

UNITED STATES PATENTS

| Number | Name | Date |
|---|---|---|
| 2,181,528 | Widell | Nov. 28, 1939 |
| 2,240,176 | Coons et al. | Apr. 29, 1941 |
| 2,264,292 | Brace | Dec. 2, 1941 |
| 1,993,764 | Ulstrand | Mar. 12, 1935 |